July 11, 1961 J. FOUFOUNIS 2,992,006

RECORD PLAYER

Filed March 27, 1959 4 Sheets-Sheet 1

Inventor:
Jean FOUFOUNIS
by: J. Delattre-Seguy
Attorney

July 11, 1961 J. FOUFOUNIS 2,992,006

RECORD PLAYER

Filed March 27, 1959 4 Sheets-Sheet 2

Inventor:
Jean FOUFOUNIS
by: J. Delattre-Seguy
Attorney

July 11, 1961 J. FOUFOUNIS 2,992,006

RECORD PLAYER

Filed March 27, 1959 4 Sheets-Sheet 3

Inventor
Jean Foufounis
by: J. Delattre-Seguy
Attorney

Inventor:
Jean FOUFOUNIS
by: J. Delattre-Seguy
Attorney

United States Patent Office 2,992,006
Patented July 11, 1961

2,992,006
RECORD PLAYER
Jean Foufounis, 35 Montgoulin (Canton de Vaud), Prilly-Lausanne, Switzerland
Filed Mar. 27, 1959, Ser. No. 802,359
Claims priority, application Switzerland Apr. 1, 1958
15 Claims. (Cl. 274—10)

This invention relates to a record player comprising, a pair of parallel plates, one of which supports a series of records disposed in a circle so as to form an annulus with its axis of revolution perpendicular to the plates, and the other of which supports a pick-up and record-playing means disposed in the centre of the records, the record player also comprising a motor for rotating one of the plates around the annulus axis, selector means and search means adapted to stop the rotatable plate at an angular position in which the pick-up is opposite the selected record.

The record player according to the invention is characterized in that it comprises two mechanisms by means of which, after the rotatable plate has stopped, the selected record is tilted in its plane towards the axis of the annulus against the record-playing means, and the pick-up is simultaneously positioned and, after the record has been played, it and the pick-up are returned to their respective initial positions.

The invention will now be described by way of example with reference to the accompanying drawings in which.

Figure 1:
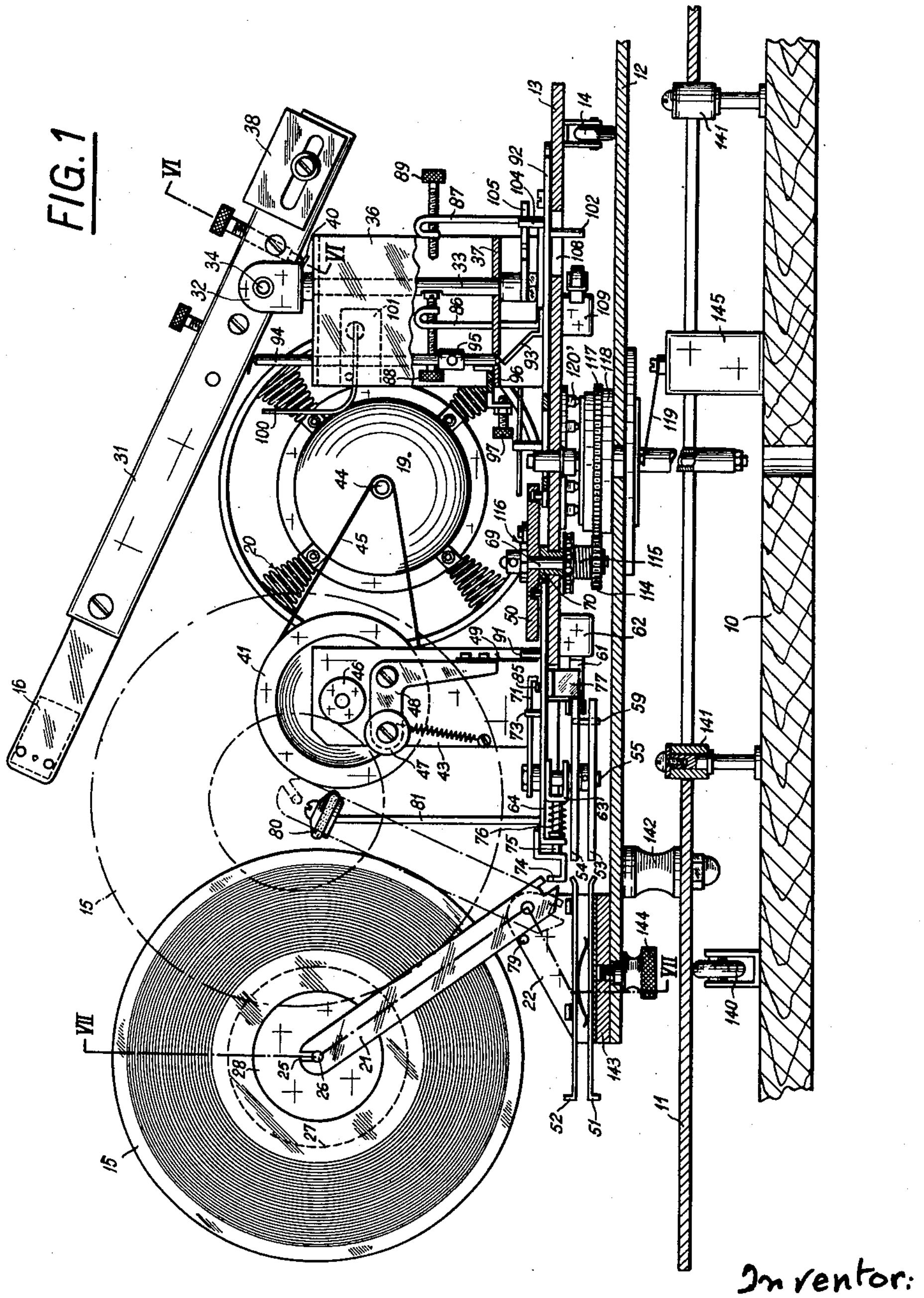
FIGURE 1 is a sectional view along a diametric vertical plane.

The record player illustrated in the drawings comprises (FIG. 1) a wooden base 10, a chassis rotatably mounted thereon by means of rollers 140, and a plate 13 rotatably mounted on the chassis by means of three rollers 14. The chassis comprises two tiers, a first tier consisting of an annular plate 11 placed on the rollers 140 and guided by centering rollers 141, and a second tier consisting of a plate 12 secured to the plate 11 by studs 142.

The plate 13 rotates on the plate 12 around a pivot 144, the geometrical axis of which coincides with the rotational axis of the plate 11.

Figure 7:
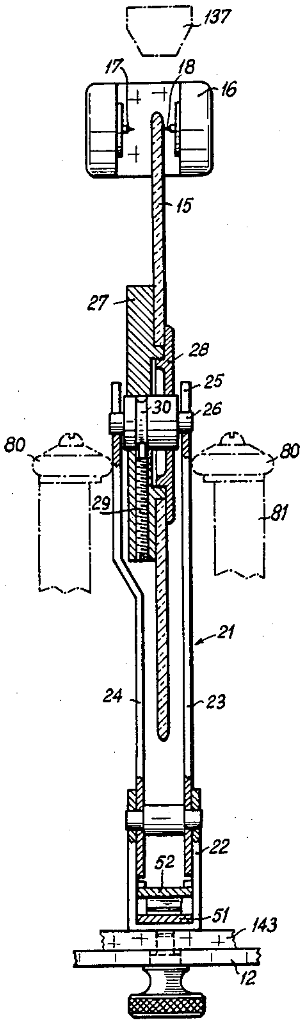
FIG. 7 is a sectional view taken along the line VII—VII of FIGURE 1.

The records 15, only one of which is shown for the sake of simplicity in the drawings, are mounted on the plate 12. They are disposed in a circle around the axis of the player in planes containing the same so as to form an annulus. A pick-up 16 comprising (FIG. 7) two sapphires 17, 18 and a drive motor 19 for record playing are secured to the plate 13. The motor 19 is fitted thereto through the agency of a resilient suspension formed by four springs 20 disposed around the motor between its stator and frame.

Each record is mounted on a support formed by a lever 21 articulated to a clevis 22 secured to the plate 12. The axis of articulation of each lever 21 is perpendicular to the plane of the record so that the record is moved in its plane when the lever on which the record is mounted tilts. The clevises 22 are secured to the plate 12 through the agency of four segments 143 maintained in position by knurled buttons 144.

The levers 21 are identical, each being formed by two arms 23, 24 (FIG. 7) which are relatively thin and formed at their upper ends with a recess 25 in which the axis 26 of the record is engaged. The record, which is of the 45 r.p.m. kind and is formed with a large central aperture, is rigidly secured to a drive roller 27 and a centering hub 28 freely rotatable around the axis 26. The axial position thereon is determined by a screw 29, the non-screw threaded end of which is engaged in an annular groove 30 in the axis 26. The bottom ends of the arms 23, 24 are bifurcated. The arm 24 is bent in its central part so that the width of the levers 21 is reduced over their whole length to the minimum and so that the largest possible number of records may be available in an apparatus of given size. The rollers 27 are of a diameter less than the unrecorded part of the records in order that both surfaces thereof may be played.

Figure 6:
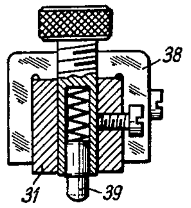
FIG. 6 is a sectional view taken along the line VI—VI of FIGURE 1.

The pick-up arm 31 is articulated (FIGS. 1 and 3) in a clevis 32 pinned to the top of a vertical spindle 33 between two pivots 34 so as to oscillate in a vertical plane. The spindle 33 is fitted to a support 35 consisting of an inverted U-member 36 secured by four screws to the plate 13 and of a bridgepiece 37. The arm 31, which is balanced by an adjustable counterweight 38, bears a spring-loaded finger 39 (FIG. 6) bearing against a strip 40 of the clevis 32.

The selected record, which, as will be described hereinafter, takes up the position illustrated in FIG. 1 in chain-dotted lines, is driven through the agency of a pulley 41, the spindle of which rotates in a bearing 42 riveted to a bracket 43, the pulley 41 being connected to the drive spindle 44, to absorb vibrations, by belting 45. The record is driven either directly, through the agency of a roller 46 secured to the spindle of the pulley 41, or through the agency of the roller 46 and an auxiliary roller 47 mounted on a rocker 48 which intervenes in the record-playing transmission according to which side of the record is to be played and in a manner to be described hereinafter. The rocker 48 is pivoted in the vertical wall of the bracket 43 and supports a resilient strip 49.

To help clarify matters, the operation of the record player illustarted in the drawings will be briefly reviewed here.

When the operator has made his selection and operated selector means to be described hereinafter, he operates a control button which causes the plates 13 to rotate. When the pick-up 16 reaches an angular position where its two sapphires are disposed one on each side of the record on which the operator's selection is recorded, the plate 13 stops. The record is then tilted into the position shown in chain-dotted lines in FIG. 1 while the pick-up 16 descends to the level of the first groove in the record, whereafter the same is rotated in the required direction while the arm 31 terminates its movement by a lateral displacement, at the finish of which one of the sapphires engages with the first groove.

When the selection has been played, the pick up returns to its initial position by two movements, firstly a disengagement from the last groove, and secondly its return to the position shown in FIG. 1. After the sapphire has been disengaged from the last groove of the record, the record returns to its position amongst the other records.

These operations and movements are controlled and synchronised by a number of mechanisms and an electric control circuit which will now be described in detail.

Two mechanisms play a very important part—a mechanism for tilting the selected record and returning the same to its initial position after playing, and a mechanism for controlling the movements of the pick-up arm. These two mechanisms, which are fully automatic in operation like the remainder of the record player, are operated by a single cam 50, rotation of which is initiated when feeler members of search means (to be described hereinafter) find an element of the selector means on their track.

The selector means comprise a pair of keys 51, 52 disposed one above another and in line with each record and engaging the clevis 22 of the record support. The bottom keys are associated with one set of record sides and the top keys are associated with the other set of record sides. To make a selection the key corresponding to the side on which the selection is recorded is depressed as far as it will go.

The search means comprise two feeler levers 53, 54 (FIGS. 1 and 3) disposed one above another at the same level as the keys 51, 52. The two levers 53, and 54 are fitted to a common spindle 55. The bottom lever 53 is keyed to the spindle 55 and the top lever 54 is mounted freely on the spindle 55. The levers 53, 54 are subjected individually to the action of two springs 56, 57 (FIG. 3) which returns them against a pin 58. The lever 54 bears a finger 59 which couples the lever 54 with the lever 53 when the same is driven in the direction of the arrow $f_1$, the finger 59 also maintaining a predetermined angular interval between the lever 53 and the lever 54 for reasons to be explained hereinafter.

The bottom arm of the feeler lever 54 is adapted to co-operate (FIG. 3) with a roller 60 fitted to a control-strip 61 of a selector switch 62. When either of the levers 53 or 54 tilts in the direction indicated by the arrow $f_1$, the selector switch 62 is operated since a tilting of the lever 53 causes a tilting of the lever 54.

The spindle 55 is borne (FIG. 1) by a stirrup 63 riveted to a draw rod 64 sliding on the plate 13. The draw rod 64, which constitutes the main element of the mechanism for tilting the selected record, is engaged below the cam 50 to which it is subjected (FIG. 2) by a pin 65 engaged in a groove 66 in its bottom surface.

Figures 2, 4:
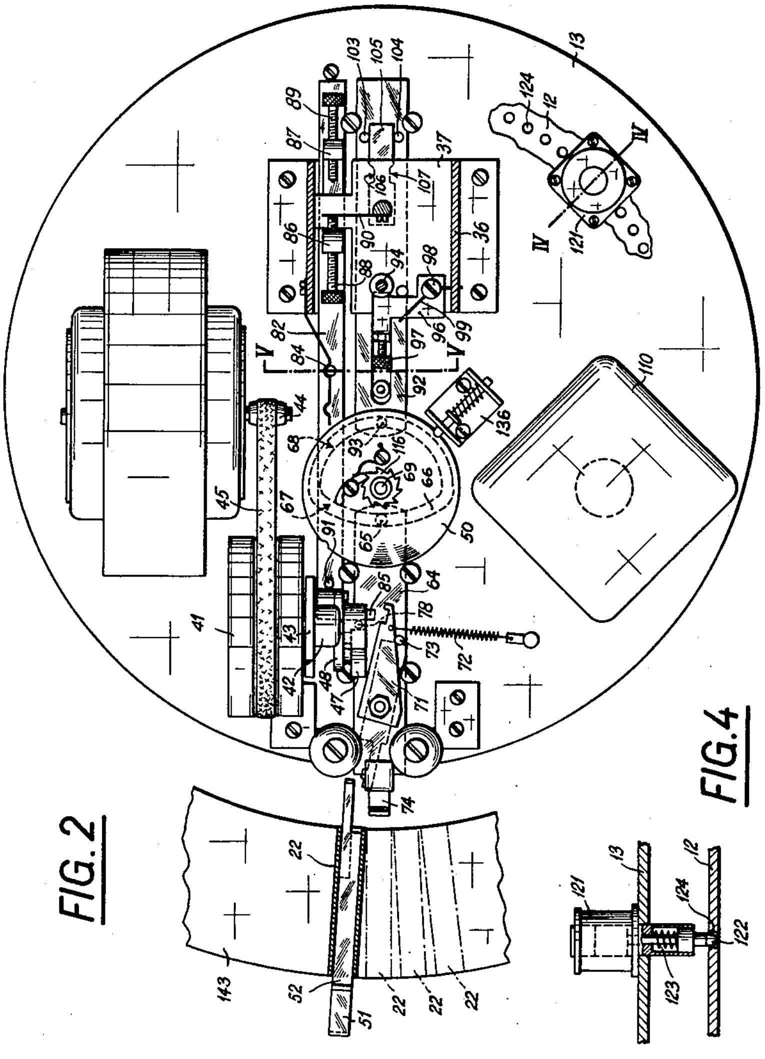
FIG. 2 is a plan view with some parts removed.
FIG. 4 is a sectional view taken along the line IV—IV of FIGURE 2.

The groove 66 comprises (FIG. 2) two arcuate parts 67, 68. The part 68 is concentric with the axis of the cam 50, while the part 67 is considerably eccentric. When the cam 50, which is keyed to a shaft 69 rotating in a bearing 70 of the plate 13, rotates out of the position in which it is illustrated in FIG. 2, the draw rod 64 moves to the left during the first quarter-revolution of the cam 50, remains stationary for the following half revolution and finally returns to its initial position during the last quarter-revolution of the cam.

The draw rod 64 also comprises (FIGS. 1 and 2), on the one hand, and keyed to the top of the spindle 55, a first hook 71 acted upon by a spring 72 which returns the hook 71 against a stop 73 of the draw rod 64, and on the other hand, a second hook 74 fitted to the end of a rod 75 slidable against a spring 76 bearing against a stirrup 63 and against a collar on the rod 75. The draw rod 64 is also rigidly secured (FIGS. 1 and 2) to a ramp 77 secured to its bottom surface and to a pin 78, the purpose of which ramp and pin will become apparent hereinafter.

When the draw rod 64 moves from right to left, the hooked part of the hook 74 engages between the prongs of the fork of the lever 21 and pivots the same into a vertical position, whereafter the lever 21 and the elements associated therewith drop by gravity against the drive roller 46.

The shape and length of the prongs of the lever 21 and the travel of the draw rod 64 (FIG. 1) are so determined that the drive roller 27 is stopped by the roller 46 (or the roller 47) slightly before the draw rod 64 has reached the outer end of its travel. The spring 76 is therefore compressed and the drive roller 27 is applied resiliently to the roller 46.

During the return movement of the draw rod 64, the hooked part of the hook 74 engages with the rearward teeth of the two arms 23, 24 and pivots the lever 21 and the associated elements until this assembly drops by its own weight against the retaining pin 79 so that the hook 74 is released and can follow the withdrawal movement initiated by the draw rod 64.

To ensure that the two arms 23, 24 of the lever 21 do not bend under the weight of the elements which they bear when the same tilt nor, after this movement, under the slightly skew force applying the drive roller 27 to the roller 46, which would lead to incorrect positioning of the edge of the roller 27 against the roller 46 or 47, the record player comprises (FIGS. 1 and 7) two guides formed by two rollers 80 rotating freely at the ends of two arms 81 which are secured to the plate 13, the lever 21 engaging between the two rollers 80 when the selected record takes up the position in which it will be played.

As just stated, the main purpose of the draw rod 64 is to move the required record into the position shown in chain-dotted lines in FIG. 1 and to return the record after it has been played. However, the draw rod 64 has two more functions—determining the direction of rotation of the selected record, and preparing the final movement of the pick-up arm 31.

The draw rod 64 fulfils these two functions through the agency of a slide 82 (FIG. 2) disposed on the plate 13 parallel with the draw rod 64 and adapted to move axially between two predetermined positions through the agency of a jumper formed by a spring strip 83 and a pin 84, the former secured to one of the walls of the bracket 35 and the pin 84 being secured to the top surface of the slide 82. The latter bears a nosepiece 85 at one end and at the other end two projections 86, 87, the nosepieces of which bear two stop screws 88, 89. The nosepiece 85 is adapted to co-operate with a recess contrived in the hook 71 in a manner and for a purpose to be described hereinafter. The screws 88, 89 apply pressure to a resilient strip 90 embedded in the spindle 33 (FIGS. 2 and 3) so as to apply to the spindle 33 a resilient torque which tends to rotate the spindle 33 in one or the other direction according to which of the screws 88, 89 is in engagement with the strip 90. The slide 82 also bears (FIGS. 1 and 2) a pin 91 against which the strip 49 of the rocker 48 bears.

When the slide 82 moves from the position shown in FIG. 2 into the position where the pin 84 is engaged in the second recess in the spring 83, the pin 91 pivots the rocker 48, with the result that the auxiliary roller 47 is introduced between the roller 46 and the drive roller 27 in the transmission system extending to the record to be played and the direction of rotation of the latter record is reversed. While the slide 82 is thus moving, the screw 88 disengages from the strip 90 and the screw 89 engages with the other side thereof. The conditions under which the slide moves will be described hereinafter.

The mechanism controlling the movements of the pick-up arm 31 comprises (FIGS. 1 and 2) a second draw rod 92 disposed in extension of the draw rod 64 and slidable, along the same axis as the draw rod 64, on the plate 13 and below the cam 50. Like the draw rod 64, the draw rod 92 comprises a pin 93 engaged in the groove 66 in the cam 50 at a place diametrically opposite the place where the pin 65 is disposed. Rotation of the cam 50 reciprocates the draw rod 92 in exactly the same manner as such rotation reciprocates the draw rod 64, but the movements of the two draw rods are staggered, the draw rod 92 remaining stationary when the draw rod 64 reciprocates and vice-versa.

The draw rod 92 bears (FIG. 1) a ramp 93 against which bears a vertical needle 94, the top of which serves as support for the pick-up arm 31.

The needle 94, which is guided in the top wall of the bracket 36 and in the bridgepiece 37, bears a ring 95, the axial position of which is variable and which, in co-operation with a retractable stop 96, is adapted to determine the angular position of the arm 31 at which the two sapphires are at the level of the first groove in the selected record. The stop 96 (FIGS. 1 and 2), which is formed by a double square and which bears a screw 97, is pivoted at 98 on the bridgepiece 37 and is subjected to the action of a spring 99 which tends to maintain it against the needle 94.

When the draw rod 92 moves to the left (FIG. 1), the needle 94 slides on the ramp 93 and drops by its own weight, followed by the arm 31, until the ring 95 abuts the stop 96. The arm 31 then stops until the screw 97, which is disposed on the path of the end of the ramp 93, engages therewith. The stop 96 is then urged against its return spring and retracted. The needle 94 is therefore released, drops and in turn releases the arm 31. When the same has dropped through a predetermined angle, it engages with a bent rod 100 rigidly secured to a switch 101 on the back wall of the bracket 36. The switch 101 is open when the rod 100 is in the position shown in FIG. 1 of the drawings.

The draw rod 92 comprises (FIG. 1) a pin 102 on its bottom surface and two fingers 103, 104 (FIGS. 1 and 2) which lock a bar 105 keyed to the spindle 33 and formed with two lateral recesses 106, 107. The pin 102, which extends through an aperture 108 in the plate 13, is adapted to operate the selector switch 109 secured below the plate 13 when the draw rod 92 reaches its extreme left-hand position.

The plate 13 and cam 50 are driven by a single motor 110 secured to the plate (FIG. 2). The transmission system comprises (FIG. 5) a chain 111 extending from a pinion 112 keyed to the drive shaft to a pinion 113 keyed to the shaft 69; a satellite pinion 114 connected to the pinion 113 by a spring coupling 115; a pawl-and-ratchet mechanism 116 intermediate the cam 50 and its shaft 69; and a toothed ring 117 extending around a cylindrical casing 118 secured to the plate 12, the satellite pinion running on the ring 117 when the plate 13 turns.

When the motor 110 drives the shaft 69 clockwise, only the spring coupling 115 is operative and so only the plate 13 rotates. When the shaft 69 is rotated anticlockwise, only the pawl-and-ratchet mechanism 116 is operative and so only the cam 50 rotates on the plate 13, which latter remains stationary.

The motors 19 and 110 are supplied (FIG. 1) through the agency of a row of brushes 119 borne by a stud 145 secured to the base 10 and by a row of rotating brushes 120′ secured below the plate 13. The commutators co-operating with the brushes are connected by conductors which extend into the casing 118.

The record player also comprises a mechanism for locking the plate 13 and a mechanism for opening the switch 120 when the plate 13 has rotated through 360° without either of the two feeler fingers 53, 54 having encountered a key 51 or 52.

The plate-locking mechanism comprises (FIGS. 2 and 4) an electromagnetic bolt comprising a solenoid 121 secured to the plate 13. The solenoid core, which extends through the plate 13 and is downwardly extended by a projection 122, is acted upon by a spring 123 which, if no current flows through the solenoid winding, engages the projection 122 in one of the apertures of a ring of apertures 124 contrived in the plate 12 to a number equal to the number of records. When the projection 122 is engaged in one of said apertures, the pick-up arm 31 is disposed opposite one of the records. When the solenoid 121 is energised, the core bearing the projection 122 is raised and the plate 13 unbolted.

The mechanism for opening the switch 120 (FIG. 3) is secured below the plate 13 and comprises: a screw-threaded rod 125 rotating solidly with the hub of one of the rollers 14; and a knife 126, the blade of which is engaged in the screwthread of the rod 125. The knife 126 is borne by a slide 127, the slideway 128 of which is articulated at 129 to the plate 13. The slide 127 has a lateral nosepiece 130 and the slideway 128 has a vane 131 co-operating respectively with the pin 102, which controls the switch 109 through the agency of the roller 132 and of the spring strip 133, and with a solenoid 134. A spring 135 it attached to the slide 127 so as to apply thereto and to the slideway 128 a resilient force which applies the knife 126 to the rod 125 and tends to return the slide 127 against the pivot 129.

When the rod 125 rotates, the knife 126 follows the screwthread thereof and the slide 127 moves along the rod 125. If during one complete revolution of the plate 13 the assembly formed by the slide 127 and slideway 128 is not acted upon by the solenoid 134 or pin 102, the end of the slide 127 bends at the end of its travel the inner strip of the switch 120 which opens. One the other hand, if, either during the movement of the slide 127 or after the opening of the switch 120, the solenoid 134 is energised or the pin 102 abuts the nosepiece 130 (which occurs immediately before any record is played, as will be seen hereinafter), the knife 126 disengages from the screwthreaded part of the rod 125 and, through the agency of the spring 135, is re-engaged in the first screwthread of the rod 125.

Finally, the record player comprises a finger jumper 136′ for accurate determination of the stop positions of the cam 50′ and a pad 137 for brushing the sapphires.

So far the complete record player has been described and a few details about its operation have been given. A detailed description will now be given, with reference to the circuit diagram illustrated in FIG. 8 of how, the various movements of the moving parts of the record player are controlled and synchronised.

Automatic operation starts when the operator, having made the required number of selections by turning the plate 11 and depressing the corresponding keys, presses a button 137. If the record player is of the prepayment kind, the button 137 will be controlled by any one of the keys 51, 52 which will be locked until the correct sum of money has been inserted.

For a better understanding of the operation of the record player, it will be assumed that both sides of a single record have been selected and that two keys 51, 52 one immediately above another have been depressed.

The player is then ready to operate and all the moving parts, including the electrical elements, are in the positions in which they are shown in the drawings.

Figures 3, 5:
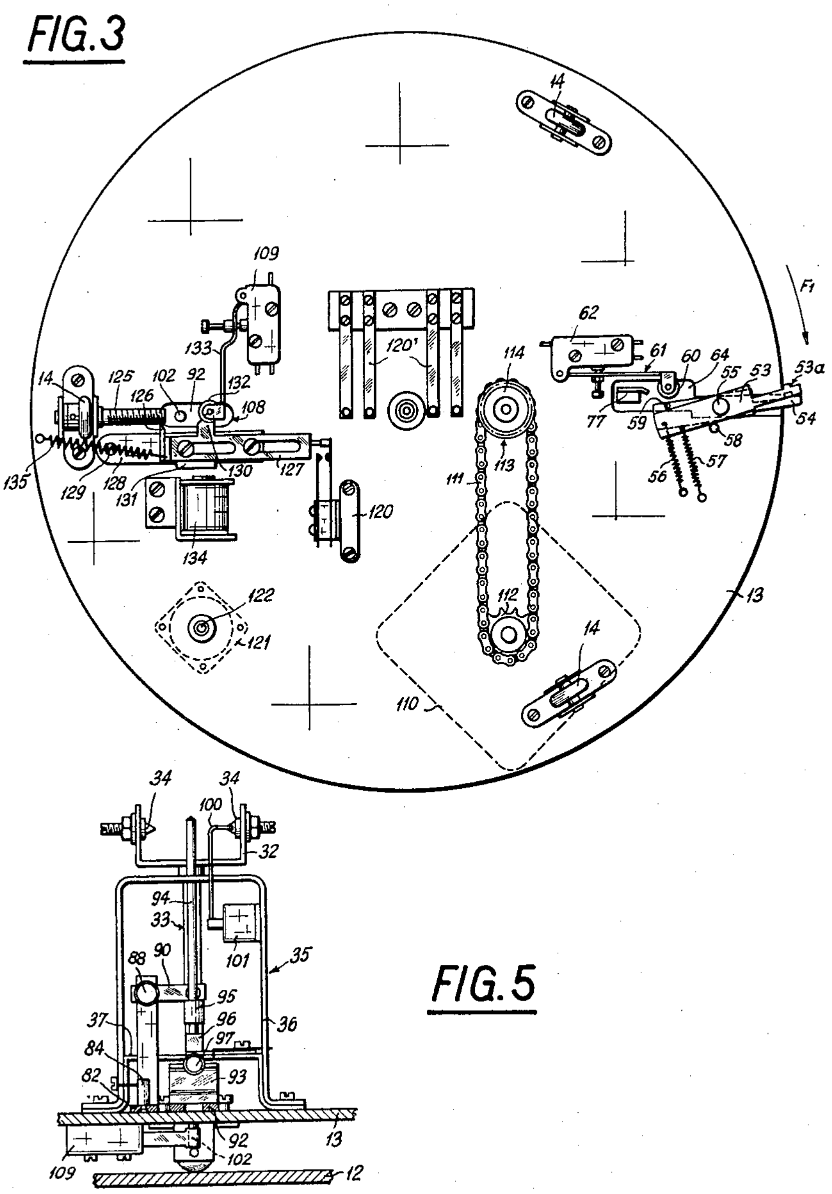
FIG. 3 is a view showing the underside of the rotatable plate.
FIG. 5 is a sectional view taken along the line V—V of FIGURE 2.
Figure 8:
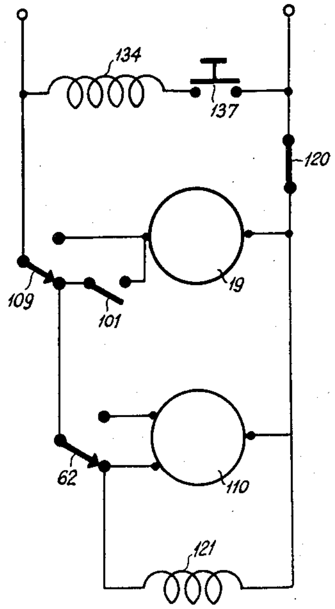
FIG. 8 is a circuit diagram of the record player.

Operation of the push button 137 (FIG. 8) initiates operation of the record player by energizing the solenoid 134 which tilts (FIG. 3) the slideway 128 in the manner hereinbefore described; such tilting returns the slide 127 against the pivot 129, engages the knife 126 in the first screwthread of the rod 125 and closes the switch 120 (FIGS. 3 and 8).

The electric circuit of the record player is therefore energised and the first phase of operation begins. The motor 110 is started and the solenoid 121 withdraws its projection 122. The selector switch 62, which determines the direction of rotation of the motor 110, is placed in the position corresponding to a driving of the plate 13—i.e., in the direction in which the coupling 115 is operative and the pawl-and-ratchet mechanism 116 inoperative. The plate 13 starts to rotate and the feeler levers 53, 54 start searching.

When the levers 53, 54 arrive before the two depressed keys, only the bottom lever 53 at first engages with the corresponding key 51, since the two levers 53, 54 are offset from one another. The lever 53 is pivoted by the key and moves the lever 54 with which the lever 53 is coupled by the pin 59 and the spindle 55 to which it is keyed. Pivoting of the lever 54 tilts the strip 61 and operates the selector switch 62 which reverses the direction of rotation of the motor 110.

This reversal, marking the completion of the first phase of operation, reverses the rotation of the shaft 69 and de-energizes the solenoid 121. The teat thereof is lowered by its spring into the aperture above which it is located, and locks the plate 13. Simultaneously, the shaft 69 is rigidly connected to the cam 50 through the agency of the pawl-and-ratchet mechanism 116. At this instant, which denotes the start of the second phase of operation, the cam 50 starts to rotate. During the first quarter-revolution thereof, the draw rod 92 remains stationary while the draw rod 64 moves from left to right and, in so doing, tilts as hereinbefore described the lever 21 bearing the selected record.

During this movement the draw rod 64 (FIG. 3) performs two other operations through the agency of the feeler lever 53, which, by means of its nosepiece 53*a*, engages with the bottom key 51 and returns the same to its initial position, and through the agency of the hook 71, which engages with the nosepiece 85 of the slideway 82 and moves the same into the position determined by the second recess in the spring 83. When the lever 53 disengages from the roller 60, the selector switch 62 is maintained in position by the ram 77 which takes the place of the lever 54.

As already stated, when the slide 82 moves from its first to its second position, the force applied to the strip 90 is reversed and the rocker 48 is pivoted, thus reversing the direction of rotation of the record to be played.

When the cam 50 starts its second quarter-revolution, which denotes the start of the third phase of operation, the record is in position and its direction of rotation, corresponding to the side to be played, has been determined.

During the whole of the third phase the draw rod 64 remains stationary while the draw rod 92 moves from the right to the left. During this movement the pick-up descends, as already stated, to the level of the first groove. During this time the two fingers 103, 104 move along the two edges of the bar 105. When the pick-up is opposite the first groove, the draw rod 92 reaches a position in which the two fingers 103, 104 reach the beginning of the recesses 106, 107. The bar 105 therefore has some freedom of angular movement, yields to the strip 90 and rotates the spindle 33 in the direction of yielding. The resulting angular displacement moves the sapphires 17 into the first groove of the recording.

The sapphires 17 thus engages immediately before the draw rod 92 reaches the end of its travel—i.e. immediately before the pin 102 reverses the selector switch 109 and, by acting upon the nosepiece 130, returns the slide 127 into its initial position.

This reversal, which is effected at exactly the same time as the test of the jumper 136 drops into one of the two recesses in the cam 50—i.e., after exactly one half revolution of the cam 50—cuts off the supply to the motor 110 and starts the motor 19. The record player starts to play the first selection.

As the selection is being played, the arm 31 descends. When the selection is completed, that is to say, when the sapphire 17 has passed through the last recorded groove, the arm 31 engages with the rod 100, with the result that the switch 101 is closed.

Such closure, which denotes the start of the fourth phase of operation, results in power being supplied again to the motor 110 which starts the cam 50 rotating in the same direction as previously. The cam 50 starts its third quarter-revolution. During this phase the draw rod 64 remains stationary the draw rod 92 returns to its initial position. During its movement the draw rod 92 starts by re-reversing the selector switch 109 which, since it is no longer retained by the pin 102, returns to its initial position. However, such re-reversal does not affect the operation of the motor 110 which is still supplied with power.

As the draw rod 92 continues to move, the arm 31 is returned by a slight lateral movement into the plane of the record at the instant when the fingers 103, 104 re-engage with the rectilinear edges of the bar 105, the needle 94 is raised by the ramp 93 and arm 31, the latter having been returned to its inoperative position. While the arm 31 is rising, the stop 96 is returned to its initial position by its return spring and the switch 101 opens, thus breaking the supply to the motor 19 which stops.

At the completion of the fourth phase the arm 31 has returned to its inoperative position.

At this instant the fifth phase of operation, corresponding to the final quarter-revolution of the cam 50, starts. During the fifth phase the draw rod 92 remains stationary while the draw rod 64 is returned to its initial position and, as it thus moves, returns the played record to its initial position, as already stated. In addition to performing this operation during the fifth phase, the draw rod 64 also returns the slideway 82 into its initial position through the agency of the pin 78 which abuts the nosepiece 85 of the slideway 82.

Upon the completion of the fifth phase the roller 60 reaches the end of the ramp 77. Since the feeler lever 53 has depressed the key 51 which has stopped it, it has been returned to the inoperative position by its return spring during the return movement of the draw rod 64, but the roller 60 stays in position, being maintained by the lever 54 which in turn bears against the key 52 which has remained in position due to the offsetting of the feeler levers 53, 54; the selector switch 62 is therefore not reversed and the motor 110 continues to drive the cam 50.

The new cycle thus initiated does not have exactly the same consequences as that initiated by the bottom feeler lever 53, for the feeler lever 54 is freely mounted on the shaft 55 and so does not pivot the hook 71.

Hence the result of maintaining the selector switch 62 reversed is, as previously, to rotate the cam 50 and move the draw rods 64, 92, but in this case the slide 82 stays in the position shown in the drawings. The roller 47 is therefore not introduced into the transmission system extending to the record to be played and the spindle 33, urged by the screw 88, turns clockwise when the fingers 103, 104 of the draw rod 92 reach the beginning of the recesses 106, 107. These are the two results which should arise out of a stoppage of the plate 13 by the top push rod corresponding to the second side of the record, since the sapphire 18 is required to co-operate therewith.

Apart from this difference, the phases of operation in this case are identical with the phases of operation associated with the first side of the record.

When the second selection has been played, all the elements have returned to their starting position and the plate 13 has started rotating again. When the plate 13 has rotated through 360°, the slide 127 opens the switch 120 which terminates the automatic operation of the record player.

What I claim is:

1. An automatic record player comprising a system of record carriers arranged in radial planes passing through a common axis, reproducing means including a tone arm adapted to be brought into operative engagement with a selected record, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record with reference to its carrier into an operative playing position, means for setting the tone arm carried by the shifted rotary plate in operative engagement with the selected record shifted into its operative playing position, means adapted to rotate the record when in said operative position, a control bar adapted to slide longitudinally in a radial plane of the rotary plate perpendicularly to the axis of the record carrier system, means whereby the movements of said control bar out of a starting position in a first direction control the means shifting into its operative playing position the selected record carried by the carrier, the plane of which registers substantially with the tone arm and operatively connects said selected record with the means adapted to rotate it, means whereby the setting of the rotary plate in a predetermined angular position produces said movement of the control bar in said direction, means controlling the means setting the tone arm into operative engagement with the record when the control bar is at the end of its movement in the first direction, and means whereby the end of the playing of the record by the tone arm returns the said control bar in a direction opposed to the first direction into its starting position.

2. An automatic record player comprising a system of record carriers arranged in radial planes passing through a common axis, reproducing means including a tone arm adapted to be brought into operative engagement with a selected record, a rotary plate carrying the reproducing means and angularly movable around the axis of the system of record carriers and adapted to be shifted into predetermined angular positions to bring the tone arm into substantial registry with the plane of the carrier of a selected record, means adapted to shift the selected record with reference to its carrier into an operative playing position, means for setting the tone arm carried by the shifted rotary plate in operative engagement with the selected record shifted into its operative playing position, means adapted to rotate the record when in said operative position, a first and a second control bar adapted to slide longitudinally in a radial plane of the rotary plane perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, and means producing in sequence, upon setting of the rotary plate in a predetermined angular position, the first-mentioned movements of the first bar and of the second bar to start the playing of the record and, after the end of said playing, the return of the second bar and then of the first bar into their starting positions.

3. An automatic record player comprising a system of record carriers arranged in radial planes passing through a common axis, reproducing means including a tone arm adapted to be brought into operative engagement with a selected record, a rotary plate carrying the reproducing means and angularly movable round the axis of the system of record carriers and adapted to be shifted into predetermined angular positions to bring the tone arm into substantial registry with the plane of the carrier of the selected record, means adapted to shift the selected record with reference to its carrier into an operative playing position, means for setting the tone arm carried by the shifted rotary plate in operative engagement with the selecter record shifted into its operative playing position, means adapted to rotate the record when in said operative position, a first and a second control bar adapted to slide longitudinally in a radial plane of the rotary plane perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, and a single cam coaxial with the plate, rotating upon setting of the rotary plate in a predetermined angular position and provided with a cam path including a semi-circle having its center on the axis of the record carrier system and two curves starting from the ends of said semi-circle and ending at a common point of the axis of symmetry lying on the side of the axis opposed to the semi-circle at a distance from said axis larger than the radius of the semi-circle, said cam path controlling the rectilinear movements of the two control bars to produce in sequence the first-mentioned movements of the first bar and of the second bar to start the playing of the record and, after the end of said playing, the return of the second bar and then of the first bar into their starting positions.

4. An automatic record player comprising a system of record carriers arranged in radial planes passing through a common axis, reproducing means including a tone arm adapted to be brought into operative engagement with a selected record, a rotary plate carrying the reproducing means and angularly movable round the axis of the system of record carriers and adapted to be shifted into predetermined angular positions to bring the tone arm into substantial registry with the plane of the carrier of the selected record, means adapted to shift the selected record with reference to its carrier into an operative playing position, means for setting the tone arm carried by the shifted rotary plate in operative engagement with the selected record shifted into its operative playing position, means adapted to rotate the record when in said operative position, a first and a second control bar adapted to slide longitudinally in a radial plane of the rotary plane perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, each control bar including a stud, and a single cam rotating round the axis of the plate upon setting of the rotary plate in a predetermined angular position and provided with a cam path including a semi-circle having its center on the axis of the record carrier system and two curves starting from the ends of said semi-circle and ending at a common point of the axis of symmetry lying on the side of the axis opposed to the semi-circle at a distance from said axis larger than the radius of the semi-circle, said cam path engaging at diametrically opposed points the studs on the control bars to produce in sequence the first-mentioned movements of the first bar and of the second bar to start the playing of the record and, after the end of said playing, the return of the second bar and then of the first bar into their starting positions.

5. An automatic record player comprising a system of record carriers arranged in radial planes passing through a common axis, reproducing means including a tone arm adapted to be brought into operative engagement with a selected record, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record with reference to its carrier into an operative playing position, means for setting the tone arm carried by the shifted rotary plate in operative engagement with the selected record shifted into its operative playing position, means adapted to rotate the record when in said operative position, a first and a second control bar adapted to slide longitudinally in a radial plane of the rotary plane perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, means producing in sequence, upon setting of the rotary plate in a predetermined angular position, the first-mentioned movements of the first bar and of the second bar to start the playing of the record and, after the end of said playing, the return of the second bar and then of the first bar into their starting positions, a projection rigid with the first control bar, selecting keys corresponding to the different records adapted to be selectively engaged by said projection to simultaneously stop the rotation of said movable plate in the angular position corresponding to a selected record and start the last-mentioned means controlling the movements of the control bars.

6. An auxiliary record player comprising a system of record carriers arranged in radial planes passing through a common axis, reproducing means including a tone arm adapted to be brought into operative engagement with a selected record selectively on each surface thereof, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record with reference to its carrier into an operative playing position, means for setting the tone arm carried by the shifted rotary plate in operative engagement with the selected record shifted into its operative playing position, means adapted to rotate the record when in said operative position, a first and a second control bar adapted to slide longitudinally in a radial plane of the rotary plane perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, means producing in sequence, upon setting of the rotary plate in a predetermined angular position, the first-mentioned movements of the first bar and of the second bar to start the playing of the record and, after the end of said playing, the return of the second bar and then of the first bar into their starting positions, an auxiliary control bar controlled by the first control bar and adapted, at the ends of its path, to simultaneously reverse the direction of rotation of the record and select the record surface engaged by the tone arm.

7. An auxiliary record player comprising a system of record carriers arranged in radial planes passing through a common axis, reproducing means including a tone arm adapted to be brought into operative engagement with a selected record selectively on each surface thereof, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record with reference to its carrier into an operative playing position, means for the setting of the tone arm carried by the shifted rotary plate in operative engagement with the selected record shifted into its operative playing position, means adapted to rotate the record when in said operative position, a first and a second control bar adapted to slide longitudinally in a radial plane of the rotary plane perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, means producing in sequence, upon setting of the rotary plate in a predetermined angular position, the first-mentioned movements of the first bar and of the second bar to start the playing of the record and, after the end of said playing, the return of the second bar and then of the first bar into their starting positions, an auxiliary control bar adapted, at the ends of its path, to simultaneously reverse the direction of rotation of the record and select the record surface engaged by the tone arm, a hook carried by the first-mentioned control bar and adapted to engage the auxiliary control bar to operate the latter when in its operative position, and means urging said hook out of its operative position to prevent reversal.

8. An automatic record player comprising a system of record carriers arranged in radial planes passing through a common axis, reproducing means including a tone arm adapted to be brought into operative engagement with a selected record selectively on each surface thereof, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record with reference to its carrier into an operative playing position, means for setting the tone arm carried by the shifted rotary plate in operative engagement with the selected record shifted into its operative playing position, means adapted to rotate the record when in said operative position, a first and a second control bar adapted to slide longitudinally in a radial plane of the rotary plate perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate, it means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, means producing in sequence, upon setting of the rotary plate in a predetermined angular position, the first-mentioned movements of the first and of the second bar to start the playing of the record and, after the end of said playing, the return of the second bar and then of the first bar into their starting positions, a pin carried by the first control bar, two series of selecting keys corresponding respectively to the front and rear sides of the different records, two projections pivotally carried by the pin on the first control bar and adapted to engage selectively the keys of the series corresponding to the front and rear sides of the record respectively to simultaneously stop the rotation of said movable plate in the angular position corresponding to a selected record and start the last-mentioned means controlling the movements of the control bars, an auxiliary control bar controlled by the first control bar and adapted, at the ends of its path, to simultaneously reverse the direction of rotation of the record and select the record surface engaged by the tone arm according to the projection engaged by a key.

9. An automatic record player comprising a system of record carriers arranged in radial planes passing through a common axis, reproducing means including a tone arm adapted to be brought into operative engagement with a selected record selectively on each surface thereof, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record with reference to its carrier into an operative playing position, means for setting the tone arm carried by the shifted rotary plate in operative engagement with the selected record shifted into its operative playing position, means adapted to rotate the record when in said operative position, a first and a second control bar adapted to slide longitudinally in a radial plane of the rotary plate perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, means producing in sequence, upon setting of the rotary plate in a predetermined angular position, the first-mentioned movements of the first bar and of the second bar to start the playing of the record and, after the end of said playing, the return of the second bar and then of the first bar into their starting positions, a pin carried by the first control bar, two series of selecting keys corresponding respectively to the front and rear sides of the different records, two projections pivotally carried by the pin on the first control bar and adapted to engage selectively the keys of the series corresponding to the front and rear sides of the record respectively, means whereby the first projection, when engaged by a key, produces a stoppage of a plate in the angular position corresponding to the record selected by the key and the starting of the means controlling the movements of the control bars and the second projection when engaged by a key controlling the first projection and thereby the stoppage and starting operations produced by the latter, an auxiliary control bar adapted, at the ends of its path, to simultaneously reverse the direction of rotation of the record and select the record surface engaged by the tone arm, a hook carried by the first-mentioned control bar and adapted to engage, when operative, the auxiliary control bar to operate the latter, means urging said hook into an inoperative position, and means whereby the second projection, when controlling the first projection, urges the hook on the first control bar into its operative position.

10. An automatic record player comprising a system of record carriers arranged in radial planes passing through a common axis, reproducing means including a tone arm adapted to be brought into operative engagement with a selected record selectively on each surface thereof, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record with reference to its carrier into an operative playing position, means for setting the tone arm carried by the shifted rotary plate in operative engagement with the selected record shifted into its operative playing position, means adapted to rotate the record when in said operative position, a first and a second control bar adapted to slide longitudinally in a radial plane of the rotary plate perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, means producing in sequence, upon setting of the rotary plate in a predetermined angular position, the first-mentioned movements of the first bar and of the second bar to start the playing of the record and, after the end of said playing, the return of the second bar and then of the first bar into their starting positions, a pin carried by the first control bar, two series of selecting keys corresponding respectively to the front and rear sides of the different records, two projections pivotally carried by the pin on the first control bar and adapted to engage selectively the keys of the series corresponding to the front and rear sides of the record respectively, means whereby the first projection, when engaged by a key, produces a stoppage of a plate in the angular position corresponding to the record selected by the key and the starting of the means controlling the movements of the control bars and the second projection controlling the first projection and thereby the stoppage and starting operations produced by the latter, a stop rigid with the second projection and adapted to engage the first projection to hold the latter spaced with reference to the first projection by an amount adapted to prevent the two projections from simultaneously engaging the two selecting keys corresponding to the front and rear surfaces of a same record, an auxiliary control bar adapted, at the ends of its path, to simultaneously reverse the direction of rotation of the record and select the record surface engaged by the tone arm, a hook carried by the first-mentioned control bar and adapted to engage, when operative, the auxiliary control bar to operate the latter, means urging said hook into an inoperative position, and means whereby the second projection, when controlling the first projection, urges the hook on the first control bar into its operative position.

11. An automatic record player comprising a system of record carriers arranged in radial planes passing through a common axis, reproducing means including a tone arm adapted to be brought into operative engagement with a selected record selectively on each surface thereof, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record with reference to its carrier into an operative playing position, means for setting the tone arm carried by the shifted rotary plate in operative engagement with the selected record shifted into its operative playing position, means adapted to rotate the record when in said operative position, a first and a second control bar adapted to slide longitudinally in a radial plane of the rotary plate perpendicularly to the axis of the system of record carriers, means whereby the shifting of the first control bar out of a starting position in a first direction controls the means shifting the selected record carrier by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, means producing in sequence, upon setting of the rotary plate in a predetermined angular position, the first-mentioned movements of the first bar and of the second bar to start the playing of the record and, after the end of said playing, the return of the second bar and then of the first bar into their starting positions, a pin carried by the first control bar, two series of selecting keys corresponding respectively to the front and rear sides of the different records, two projections pivotally carried by the pin on the first control bar and adapted to engage selectively the keys of the series corresponding to the front and rear sides of the record respectively, means whereby the first projection, when engaged by a key, produces a stoppage of a plate in the angular position corresponding to the record selected by the key and the starting of the means controlling the movements of the control bars and the second projection controlling the first projection and thereby the stoppage and starting operations produced by the latter, a stop rigid with the second projection and adapted to engage the first projection to hold the latter spaced with reference to the first projection by an amount adapted to prevent the two projections from simultaneously engaging the two selecting keys corresponding to the front and rear surfaces of a same record, further stops rigid with each projection and adapted to be shifted by the positioning of the selected record in its operative playing position into a position urging the selecting key back into its starting position, an auxiliary control bar adapted, at the ends of its path, to simultaneously reverse the direction of rotation of the record and select the record surface engaged by the tone arm, a hook carried by the first-mentioned control bar and adapted to engage, when operative, the auxiliary control bar to operate the latter, means urging said hook into an inoperative position, and means whereby the second projection, when controlling the first projection, urges the hook on the first control bar into its operative position.

12. An automatic record player comprising a system of record carriers arranged in radial planes passing through a common axis, reproducing means including a tone arm adapted to be brought into operative engagement with a selected record, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record with reference to its carrier into an operative playing position, means for setting the tone arm carried by the shifted rotary plate in operative engagement with the selected record shifted into its operative playing position, means adapted to rotate the record when in said operative position, a first and a second control bar adapted to slide longitudinally in a radial plane of the rotary plate perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, and a single shaft adapted to control selectively and in succession the rotation of the rotary plate into a predetermined angular position and the movement of the two control bars to produce in sequence the first-mentioned movements of the first bar and of the second bar to start the playing of the record and, after the end of said playing, the return of the second bar and then of the first bar into their starting positions.

13. An automatic record player comprising a system of record carriers arranged in radial planes passing through a common axis, reproducing means including a tone arm adapted to be brought into operative engagement with a selected record, a rotary plate carrying the reproducing means and angularly movable round the axis of the system of record carriers and adapted to be shifted into predetermined angular positions to bring the tone arm into substantial registry with the plane of the record carrier of a selected record, means for setting the tone arm carried by the shifted rotary plate in operative engagement with the selected record shifted into an operative playing position, means adapted to rotate the record when in said operative position, a first and a second control bar adapted to slide longitudinally in a radial plane of the rotary plate perpendicularly to the axis of the system of record carriers, a lever adapted to shift the selected record in its plane out of its record carrier into its operative playing position, a stud on the first control bar engaging operatively said lever, the shifting of the first control bar out of a starting position in a first direction shifting through said stud the lever and the selected record to make the latter enter its operative playing position and simultaneously producing operative engagement of the selected record with the means adapted to rotate it and the shifting of the first control bar in the direction opposed to said first direction shifting the record back into its carrier and disconnecting it from the means adapted to rotate it, means whereby the second control bar, when shifted out of a starting position in one direction, controls the means setting the tone arm in operative engagement with the record in its operative playing position, means whereby the movement of said second control bar in the direction opposed to said one direction, returns the tone arm into its inoperative position away from the selected record, and means producing in sequence, upon setting of the rotary plate in a predetermined angular position, the first-mentioned movements of the first bar and of the second bar to start the playing of the record and, after the end of said playing, the return of the second bar and then of the first bar into their starting positions.

14. An automatic record player comprising a system of record carriers arranged in vertical planes passing through a common axis, reproducing means including a tone arm adapted to be brought into operative engagement with a selected record, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record in its plane with reference to its carrier into an operative playing position, means adapted to rotate the record when in said operative position, a first and a second control bar adapted to slide longitudinally in a radial plane of the rotary plate perpendicularly to the axis of the system of record carriers, means whereby the shifting of the first control bar out of a starting position in a first direction controls the means shifting the selected record carried by the carrier, the plane of which registers substantially with that of the reproducing means, into its operative playing position and produces operative engagement of said selected record with the means adapted to rotate it, means whereby the shifting of the first bar in the direction opposed to said first direction urges said record back into its starting position with reference to its carrier and disconnects it from the means adapted to rotate it, a rod holding normally the tone arm outside the bulk of the record carriers, means whereby the movement of the second control bar in one direction, releases said rod to allow a dropping of the tone arm into transverse registry with the selected record in its playing position, means whereby said second control bar shifts, at the end of said movement in one direction, the dropped tone arm laterally into engagement with the beginning of the groove in the selected record, means whereby the return movement of the second control bar returns the tone arm into its starting position through successive lateral and upward movements, and means producing in sequence, upon setting of the rotary plate in a predetermined angular position, the first-mentioned movements of the first bar and of the second bar to start the playing of the record and, after the end of said playing, the return of the second bar and then of the first bar into their starting positions.

15. An automatic record player comprising a system of record carriers arranged in radial planes passing through a common axis, reproducing means including a tone arm adapted to be brought into operative engagement with a selected record, a rotary plate carrying the reproducing means and angularly movable round the axis of the system of record carriers and adapted to be shifted into predetermined angular positions to bring the tone arm into substantial registry with the plane of the carrier of a selected record, means adapted to shift the selected record with reference to its carrier into an operative playing position, means for setting the tone arm carried by the shifted rotary plate in operative engagement with the selected record shifted into its operative playing position, a record-driving motor including a stator and a rotor adapted to rotate the record when in said operative position, an elastic suspension including a plurality of frusto-conical helical springs arranged annularly between the stator of the record-driving motor and the rotary plate, a control bar adapted to slide longitudinally in a radial plane of the rotary plate perpendicularly to the axis of the record carrier system, means whereby the movement of said control bar out of a starting position in a first direction controls the shifting into its operative playing position the selected record carried by the carrier, the plane of which is in substantial registry with the tone arm and operatively connects said selected record with the record-driving motor, means whereby the setting of the rotary plate in a predetermined angular position produces said movement of the control bar in said first direction, means controlling the means setting the tone arm into operative engagement with the record when the control bar is at the end of its movement in the first direction, and means whereby the end of the playing of the record by the tone arm returns the said control bar in a direction opposed to the first direction into its starting position, to shift back and disconnect the record.

References Cited in the file of this patent

UNITED STATES PATENTS 2,804,307 Rockola ---------------- Aug. 27, 1957

FOREIGN PATENTS 466,769 Great Britain ------------ June 4, 1937